May 29, 1956     R. F. E. STEGEMAN     2,747,729
SPECTACLE CASE
Filed Dec. 27, 1954
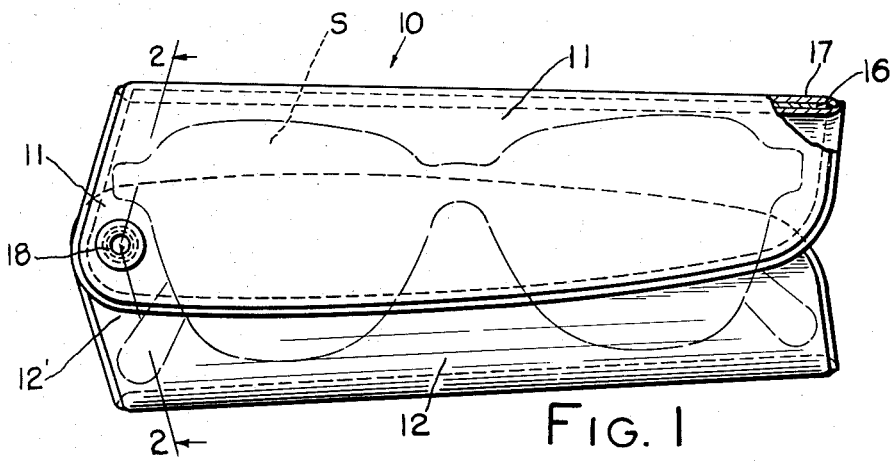
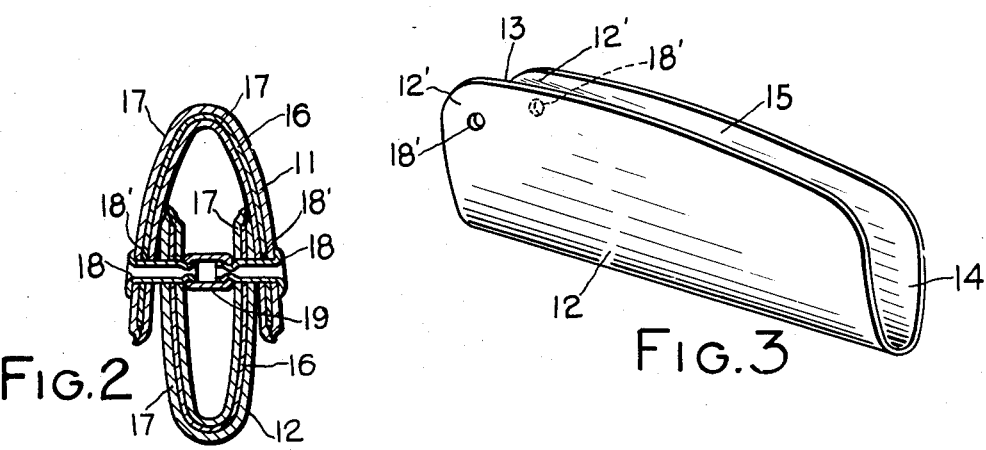
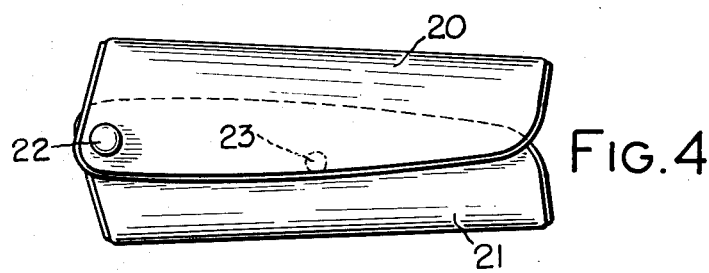
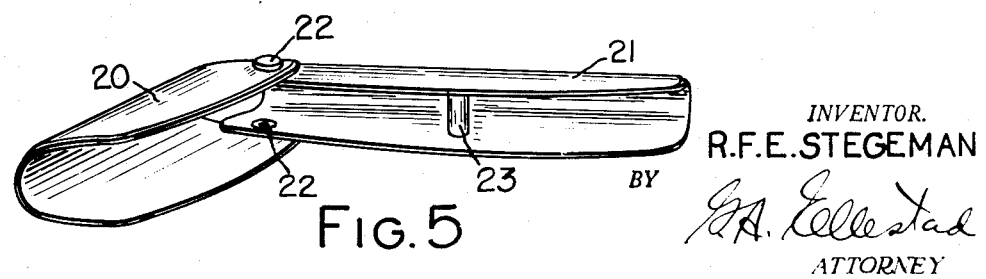
INVENTOR.
R.F.E. STEGEMAN
BY
ATTORNEY

2,747,729

SPECTACLE CASE

Raymond F. E. Stegeman, Greece, N. Y., assignor to Bausch & Lomb Optical Company, Rochester, N. Y., a corporation of New York Application December 27, 1954, Serial No. 477,693

2 Claims. (Cl. 206—6)

This invention relates to spectacle cases and has for one of its objects the provision of a spectacle case which will be simple in structure yet efficient in use. Another object is to provide a spectacle case which can be readily and easily made with a minimum amount of tools and manufacturing operations. A further object is to provide a spectacle case which will afford protection to a variety of types and sizes of spectacles and will be conveniently accessible for the insertion or removal of a spectacle. A further object is to provide a spectacle case which will have the convenience of an open-ended case while still affording substantially the same degree of protection as is provided by the hinged cover type of spectacle case. These and other objects and advantages reside in certain novel features of construction, arrangement and combination of parts as will hereinafter be more fully described and pointed out in the appended claims.

Referring to the drawings:

Fig. 1 is a front elevational view of a spectacle case embodying my invention, with parts in section.

Fig. 2 is a sectional view taken on line 2—2 of Fig. 1.

Fig. 3 is a perspective view of one of the body members used in constructing the case.

Fig. 4 is a front elevational view of a modification.

Fig. 5 is a perspective view looking into the opened case of Fig. 4.

A preferred embodiment of my invention is shown in the drawings wherein 10 indicates, generally, a spectacle case comprising a pair of elongated, U-shaped, open-ended body members 11 and 12, respectively. The body members 11 and 12 are formed of any suitable resilient sheet material and, as shown on the drawings, they preferably have substantially the same size and shape so that both body members may be manufactured with the same set of tools. As shown in Fig. 3, each body member has a substantially U-shape with open ends 13 and 14 and a longitudinally extending open side 15. Each body member 11 and 12 is, as shown in Fig. 2, formed of an inner sheet metal member 16 which is covered on both sides with a suitable covering material 17, such as plastic sheeting, leather or the like, which may be sewed, heat-sealed or cemented together along the edges.

The side end portions 12' of member 12 are positioned between the side end portions 11' of member 11 with the longitudinally extending open sides 15 of the members facing each other. The adjacent overlapping end portions 11' and 12' of the sides are pivotally connected, such as by pivot members 18 which extend through openings 18' in the walls of the sides and thereby serve to pivotally connect the two body members 11 and 12.

With this construction, the two body members may be selectively moved toward each other so as to form a protecting enclosure for an object, such as a spectacle S. Since the body members are formed of resilient material, the overlapping side portions of the body members are in frictional engagement with each other and hence the body members are releasably held in any adjusted position. In order to limit endwise movement of the spectacle S to retain it within the case, there is provided a stop means which extends between the walls of the innermost member 12 and may take the form of the stop member 19 which is connected to the two pivot means 18, as shown in Fig. 2.

A modified form of my invention is disclosed in Figs. 4 and 5 wherein the body members 20 and 21, similarly formed as in the case shown in Figs. 1–3, have their adjacent overlapping end portions of the sides pivotally connected by pivot means 22 so that the two body members 20 and 21 are hingedly connected and may be moved toward each other to form an enclosure for a spectacle.

In order to prevent endwise movement of the spectacle in the case, a stop member, such as a pin 23, is fastened between the side walls of body member 21 at a point which is substantially intermediate the ends thereof, as shown in Fig. 5. In this form of the invention, the spectacle is placed with the bridge member located over the stop member 23 and then the body members are close together so as to form a protecting enclosure for the spectacle. The overlapping portions of the body members 20 and 21 are in frictional engagement with each other and hence the body members are releasably held in adjusted position.

From the foregoing, it will be apparent that I am able to attain the objects of my invention and provide a spectacle case which will be efficient in use, yet relatively simple in structure so that it may be produced with a minimum amount of manufacturing operations. In the form shown in Figs. 1–3, the body members 11 and 12 may be opened or separated by an amount sufficient to permit the spectacle S to be inserted into the open, unobstructed end of the case which is shown in the right-hand side of Fig. 1. The body members 11 and 12 may then be moved together slightly so that the spectacle will be held within the case and prevented from dropping out the unobstructed end thereof. Hence, my case will afford substantially the convenience of an open-ended type of case while still affording substantially the complete protection provided by the hinged cover type of case. The body members may be formed of any suitable sheet material which is relatively stiff and possesses some resilience and the material may be covered, or otherwise. Thus, for example, the body members may be formed of a fibrous sheet material which can be formed to the desired configuration. Instead of the tubular rivet and stop member construction 18, 19, the body members could be pivotally connected, for example, by screws or pins which are driven into the opposite ends of a suitable wood or plastic tube or dowel pin and thereby provide not only the pivotal connection for the side members but also a stop means for limiting endwise movement of the spectacle in the case. Various other modifications may obviously be made without departing from the spirit of the invention.

I claim:

1. A spectacle case comprising a first body member and a second body member, both of said members being made of resilient sheet material and each having an elongated, open-ended U-shaped form of substantially the same length, the two members being arranged with the longitudinal open sides of the two members facing each other and with one end portion of the first member positioned within an end portion of the second member, pivot means connecting the adjacent side end portions of the members whereby the members are adapted to be moved towards each other in overlapping relation to form an enclosure for a spectacle, the frictional engagement of the overlapping portions acting to hold the members in position, and stop means positioned between the two sides of the innermost member to limit endwise movement of the spectacle whereby the spectacle will be retained in the enclosure.

2. A spectacle case comprising a pair of elongated, U-shaped, open-ended body members formed of resilient sheet material and having substantially the same size and shape, the side portions at one end of one member being positioned between the side portions at one of the other member with the open sides of the members facing each other, pivot means pivotally connecting the adjacent side portions of the members whereby the members are adapted to be moved towards each other into overlapping relation to form an enclosure for a spectacle, the overlapping sides of the members being in frictional engagement with each other whereby the members are releasably held in position, and a stop member connecting the pivot means and extending between the side ends of the said one member to limit the endwise movement of the spectacle for retaining it in the case.

References Cited in the file of this patent

UNITED STATES PATENTS

| | | |
|---|---|---|
| 1,951,079 | Zihlman | Mar. 13, 1934 |
| 2,079,002 | de Loeschnigg | May 4, 1937 |